United States Patent
Yu

(10) Patent No.: US 10,464,147 B2
(45) Date of Patent: Nov. 5, 2019

(54) COMBINED ARBOR STRUCTURE

(71) Applicant: Chiu-Lien Yu, Taichung (TW)

(72) Inventor: Chiu-Lien Yu, Taichung (TW)

( * ) Notice: Subject to any disclaimer, the term of this patent is extended or adjusted under 35 U.S.C. 154(b) by 0 days.

(21) Appl. No.: 15/923,567

(22) Filed: Mar. 16, 2018

(65) Prior Publication Data
US 2019/0283152 A1   Sep. 19, 2019

(51) Int. Cl.
*B23C 5/26* (2006.01)
*B23C 5/10* (2006.01)

(52) U.S. Cl.
CPC ............... *B23C 5/26* (2013.01); *B23C 5/109* (2013.01); *B23C 2200/0477* (2013.01); *B23C 2210/02* (2013.01); *B23C 2210/168* (2013.01); *B23C 2240/32* (2013.01)

(58) Field of Classification Search
CPC ... B23C 5/26; B23C 2210/02; B23C 2240/32; B23C 2240/00
See application file for complete search history.

(56) References Cited

U.S. PATENT DOCUMENTS 8,702,351 B2 * 4/2014 Gamble .............. B23B 31/1076
407/40

9,149,874 B2 * 10/2015 Hiroumi ............... B23B 31/305
2013/0033009 A1 * 2/2013 Hoffer .................. B23B 31/305
279/4.01

FOREIGN PATENT DOCUMENTS

DE         2328176 A1 * 12/1974 ............... B23C 5/26
DE         3019970 A1 * 12/1981 ......... B23B 31/1076
WO   WO-2005058533 A1 *  6/2005 ........... B23B 29/025

* cited by examiner

*Primary Examiner* — Alan Snyder
(74) *Attorney, Agent, or Firm* — Muncy, Geissler, Olds & Lowe, P.C.

(57) ABSTRACT

A combined structure of an arbor and an arbor seat, including: an arbor, having a first assembling portion which has at least one first hole, each first hole having a first central axis; an arbor seat, having a second assembling portion which is disposed in the axial direction, and the first assembling portion and the second assembling portion being insertably connected with each other, the second assembling portion having at least one second hole which has a second central axis, when the first and second assembling portions are connected with each other in the axial direction, each second central axis is noncoaxial and nonoverlapped with the at least one first central axis; and wherein at least one said fastener is inserted into one said first hole and one said second hole, and urges one said first hole and one said second hole in axially opposite directions.

10 Claims, 6 Drawing Sheets

COMBINED ARBOR STRUCTURE

BACKGROUND OF THE INVENTION

Field of the Invention

The present invention relates to a combined arbor structure.

Description of the Prior Art

For a variety of processing needs and inevitable wear of a cutting tool, the cutting tool needs to frequently change. The cutting tool includes an arbor seat which is adapted for assembling a blade, and an arbor which is assembled to a machine. And connect the arbor seat with the arbor by a bolt so that it only needs to disassemble the arbor seat to change the cutting tool. Comparing the whole set of cutting tool to the arbor seat, the arbor seat is more light. Thus, the time to change the cutting tool is more easy and time-saving.

However, a conventional fixing processing simply fixes the arbor and the arbor seat together by the bolt. In the conventional fixing processing, the bolt is easy loosed so that a relative position between the arbor seat and the arbor is more easily to change to affect the processing quality.

The present invention is, therefore, arisen to obviate or at least mitigate the above mentioned disadvantages.

SUMMARY OF THE INVENTION

An object of the present invention is to provide a combined arbor structure, which is urged the arbor seat firmly; and it provides simple structure, simple manufacture, and adapts for a variety of cutting tools. In addition, it is easy for assembling.

To achieve the above and other objects, a combined arbor structure is provided, including: an arbor, having a first assembling portion disposed in an axial direction, the first assembling portion having at least one first hole disposed laterally, each of the at least one first hole having a first central axis; an arbor seat, having a second assembling portion which is disposed in the axial direction, one of the first assembling portion and the second assembling portion being insertably connected with the other of the first assembling portion and the second assembling portion, the second assembling portion having at least one second hole disposed laterally, each of the at least one second hole having a second central axis, when the first and second assembling portions are connected with each other in the axial direction, each second central axis of the at least one second hole is noncoaxial and nonoverlapped with the at least one first central axis; at least one fastener; and wherein at least one said fastener is inserted into at least one said first hole and at least one said second hole and urges the at least one said first hole and the at least one said second hole in axially opposite directions relative to the axial direction.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 3A is a partially-enlarged view of the cross-sectional view of FIG. 3;

FIG. 4A is a partially-enlarged view of the cross-sectional view of FIG. 4;

DETAILED DESCRIPTION OF THE PREFERRED EMBODIMENTS

Figure 1:
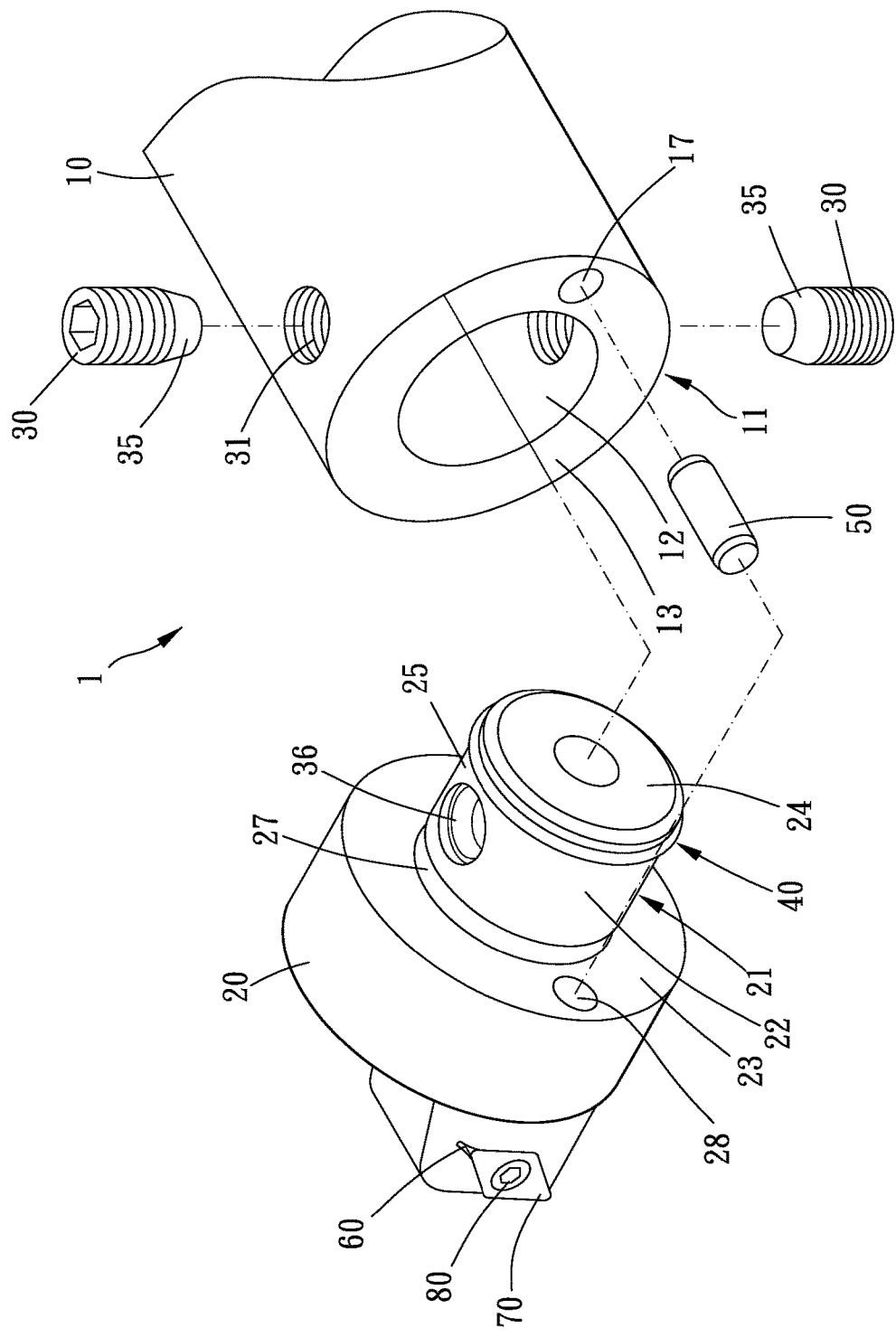
FIG. 1 is a breakdown drawing of a preferred embodiment of the present invention.
Figure 2:
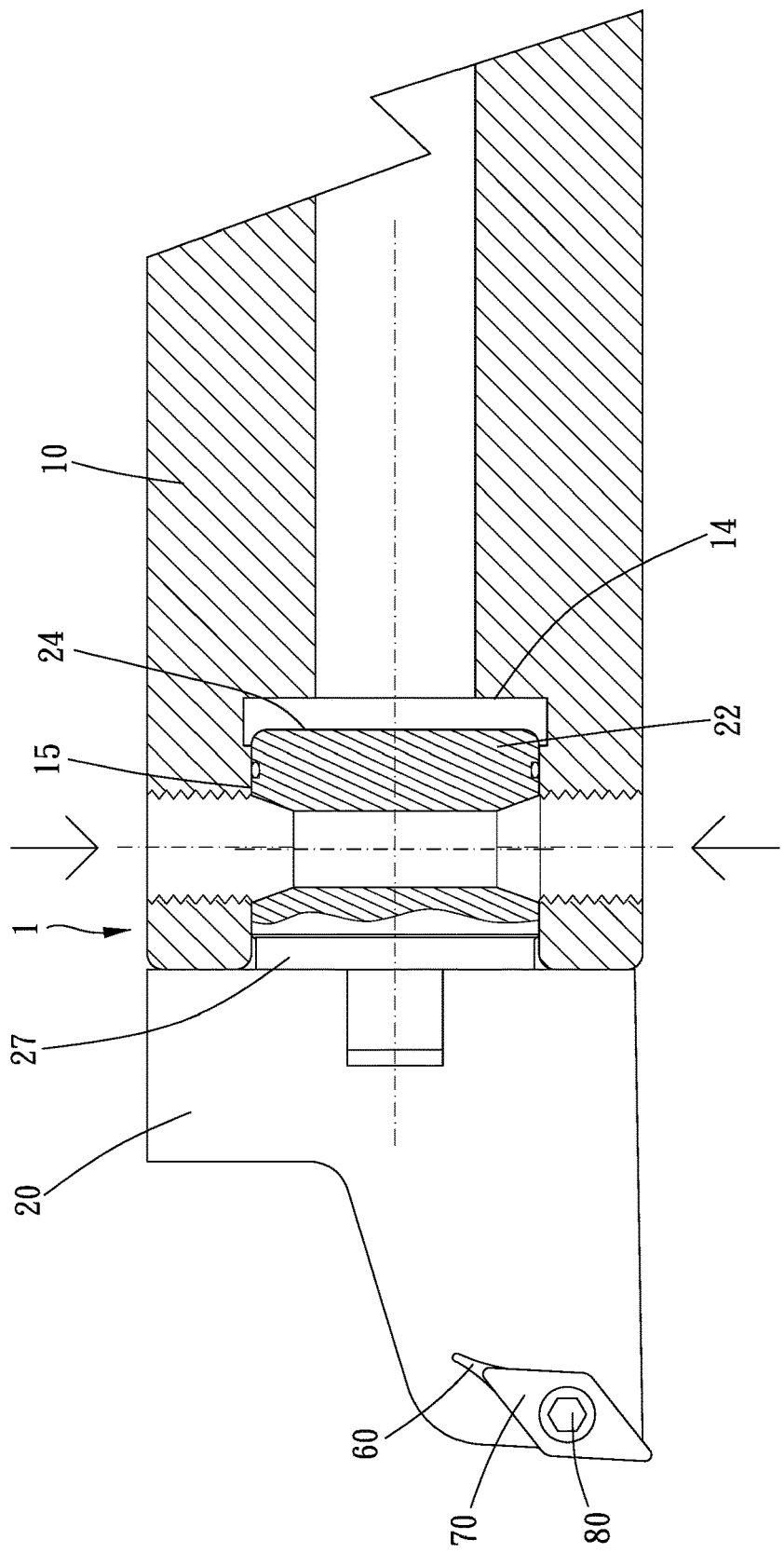
FIG. 2 is a cross-sectional view of the preferred embodiment of the present invention.
Figure 3:
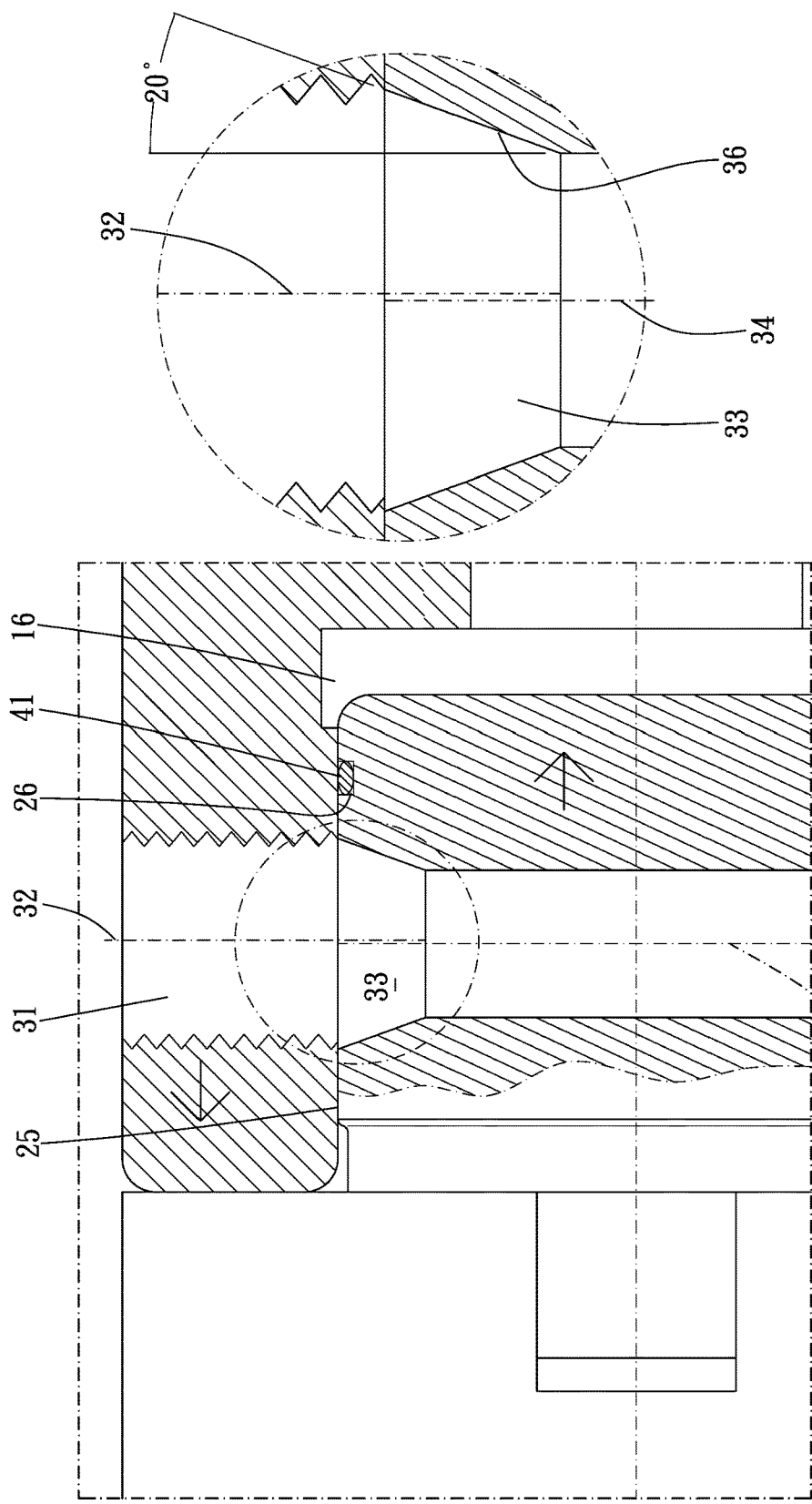
FIG. 3 is a partially-enlarged view of the cross-sectional view of the preferred embodiment of the present invention.
Figure 4:
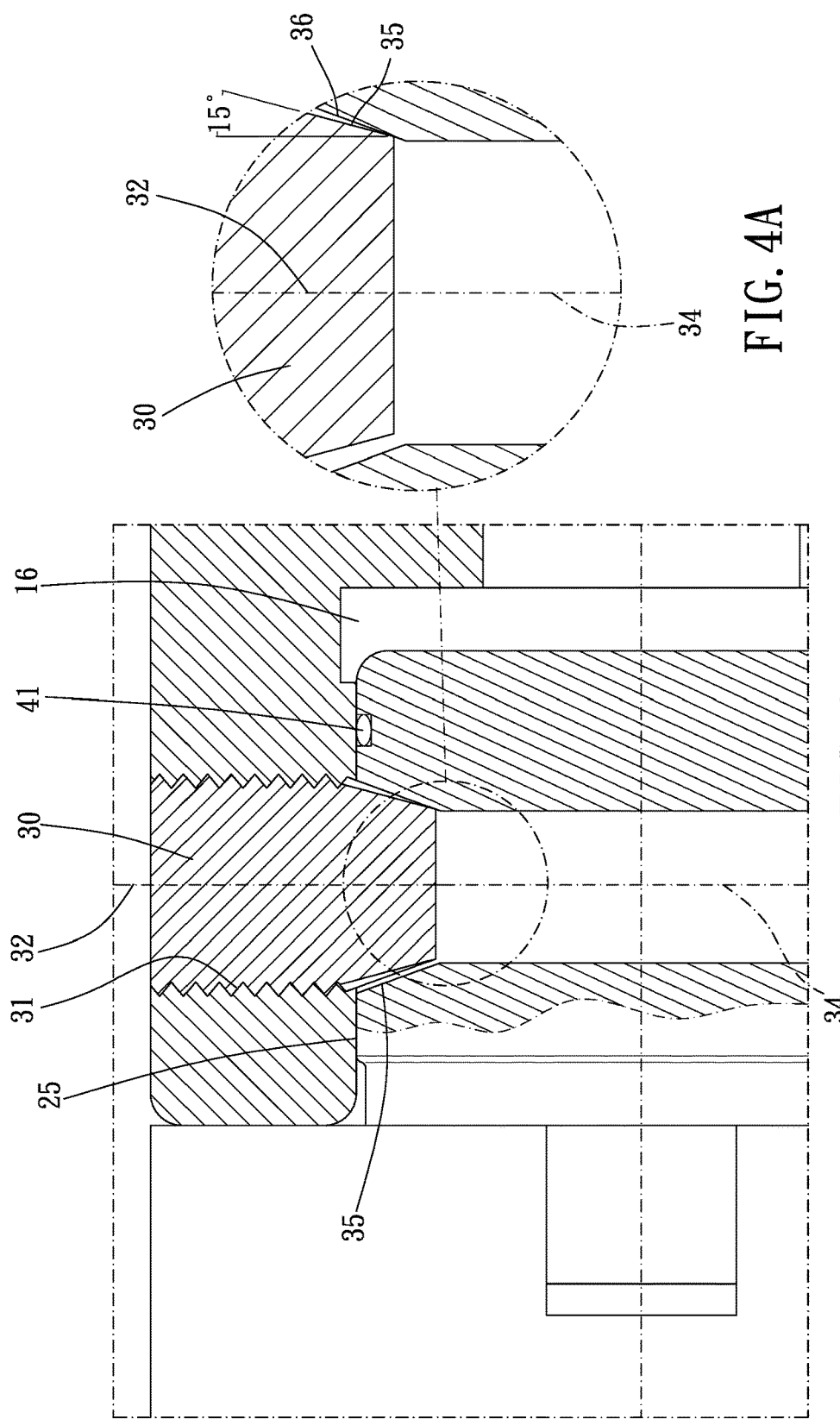
FIG. 4 is a partially-enlarged view of the preferred embodiment of an assembled structure of the present invention.

FIGS. 1 to 4 show a combined arbor structure according to a preferred embodiment of the present invention. The combined arbor structure 1 includes an arbor 10, an arbor seat 20, and at least one fastener 30.

The arbor 10 has a first assembling portion 11 disposed in an axial direction, the first assembling portion 11 has at least one first hole 31 disposed laterally, each of the first hole 31 has a first central axis 32. The arbor seat 20 has a second assembling portion 21 which is disposed in the axial direction, one of the first assembling portion 11 and the second assembling portion 21 is insertably connected with the other of the first assembling portion 11 and the second assembling portion 21. The second assembling portion 21 has at least one second hole 33 disposed laterally, each of the at least one second hole 33 has a second central axis 34. When the first and second assembling portions 11, 21 are connected with each other in the axial direction, each second central axis 34 of the at least one second hole 33 is noncoaxial and nonoverlapped with the at least one first central axis 32. At least one said fastener 30 is inserted into at least one first said hole 31 and the at least one said second hole 33 and urges the at least one said first hole 31 and the at least one said second hole 33 in axially opposite directions relative to the axial direction. Because of the first central axis 32 is noncoaxial and nonoverlapped with the second central axis 34, the fastener 30 provides a pushing force to urge the arbor seat 20 along the axial direction of the arbor 10 when the fastener 30 is disposed through the arbor 10 and the arbor seat 20. Therefore, a reverse force of the pushing force can prevent the fastener 30 and the arbor seat 20 from loosing due to a shock which is formed in manufacturing process. In this embodiment, a distance range between the first and second central axis' 32, 34 along the axial direction of the arbor 10 is 0.50 mm to 0.80 mm.

In this embodiment, the first assembling portion 11 has two the first holes 31 which are corresponding to each other and respectively disposed on the opposite two sides thereof. One of the first and second assembling portions 11, 21 includes an insertion slot 12 and the other includes an insertion head 22. More specifically, an end face 13 of the first assembling portion 11 has the insertion slot 12, and an end face 23 of the second assembling portion 21 has the insertion head 22. However, the insertion slot and the insertion head can be exchanged and respectively be disposed on the second assembling portion and the first assembling portion. The end face 13 of the first assembling portion 11 and the end face 23 of the second assembling portion 21 are abutted against each other, a bottom face 14 of the insertion slot 12 and an end face 24 of the insertion head 22 has a span therebetween and do not abut against each other.

Preferably, a flexible portion 40 is engagingly disposed between a circumferential face 25 of the insertion head 22 and a wall 15 of the insertion slot 12. The flexible portion 40 can be but not limited to rubbers, plastics such as self-lubricating materials like Teflon. More specifically, the circumferential face 25 of the insertion head 22 has at least one annular groove 26, and the flexible portion 40 includes at least one flexible ring 41 received in the at least one annular groove 26 and radially protrudes out of the at least one annular groove 26. In this embodiment, the flexible portion 40 includes one annular groove 26 and one flexible ring 41. However, the flexible portion 40 can also have above two annular grooves and above two flexible rings along the insertion head 22 in the axial direction. By the at least one flexible ring 41, the arbor seat 20 can be initially secured to the arbor 10 for installation easily, and also can decrease damping force and prevent outer objects such as chips and cutting fluid from entering insides of the arbor 10 and arbor seat 20. In this embodiment, the flexible portion 40 is disposed on the circumferential face 25 of the insertion head 22.

Preferably, a bottom of the insertion slot 12 has expanded slot 16 disposed radially, the insertion head 22 has an annular concave 27 connected with the end face 23 of the second assembling portion 23. At least a part of the insertion head 22 is disposed within the expanded slot 16. By processing the annular concave 27 and the expanded slot 16, it can remove residual materials due to an interference of the cutting tool, so as to insure that the end face 13 and the end face 23 can be abut against each other firmly.

Preferably, each of the at least one fastener 30 includes a tapered conical end 35, each of the at least one second hole 33 includes an expanded conical opening 36 which faces the tapered conical end 35, and the tapered conical end 35 abuts against the expanded conical opening 36. By the conical structures of the tapered conical end 35 and the expanded conical opening 36, a force which is formed when the fastener screws the arbor 10, can let the arbor seat 20 fit to the arbor seat 20 strongly and tightly in the axial direction. And also, it can be more easily to guide the fastener 30 into the second hole 33. Each fastener 30 is better as for example a screw member of socket set screws. Each said first hole 31 is a screw hole, and each said tapered conical end 35 is a cone. Preferably, a slope degree of an inclined face of the tapered conical end 35 of the fastener 30 is not equal to a slope degree of an inclined face of the expanded conical opening 36 of the second hole 33. More specifically, the slope degree of the inclined face of the tapered conical end 35 of the fastener 30 is less than the slope degree of the inclined face of the expanded conical opening 36 of the second hole 33. The prefer slope degree of the embodiment is shown in FIG. 3A and FIG. 4A, the slope degree of the tapered conical end 35 is 30°, as shown in FIG. 4A. The slope degree of the expanded conical opening 36 is 40°, as shown in FIG. 3A. And a design of the slope degree that the slope degree of the tapered conical end is less than the expanded conical opening can make sure a part of the inclined face of the tapered conical end 35 and a part of the inclined face of the expanded conical opening 36 can abut against each other.

Because of the tapered conical end of the fastener 30 and the expanded conical opening of the second hole 33 are incomplete contact to each other. In other words, the tapered conical end of the fastener 30 and the expanded conical opening of the second hole 33 are an annular-linear type of "partially contact". When a stress of the arbor 10 which is formed in a milling process transfers to a part of the fastener 30 which is within the second hole 33, the stress of the tapered conical end 35 and the expanded conical opening 36 can be reduced the possibility of concentration, so as to eliminate the inclined faces of the tapered conical end 35 and expanded conical opening 36 from wearing each other to induce an engagement of the tapered conical end 35 and expanded conical opening 36. Thereby, the fastener 30 can be easily remove from the second hole 33.

In this embodiment, a fixed manner of the arbor 10 and the arbor seat 20 is by a positioning pin 50, and each of the end face 13 of the first assembling portion 11 and the end face 23 of the second assembling portion 21 has an insertion hole 17, 28 extending axially. The positioning pin 50 is inserted into the insertion holes 17, 28 which are extending axially of each of the end faces 13, 23 respectively; Thus, the first hole 30 of the arbor 10 and the second hole 33 of the arbor seat 20 can be corresponding to each other, so as to 45 be fastened tightly. Preferably, a number of each said insertion holes 17, 18 are plurality, and are respectively corresponding to a number of the plurality of positioning pins. The plurality of insertion holes 17, 18 can respectively use to be inserted the plurality of positioning pins therein.

Figure 5:
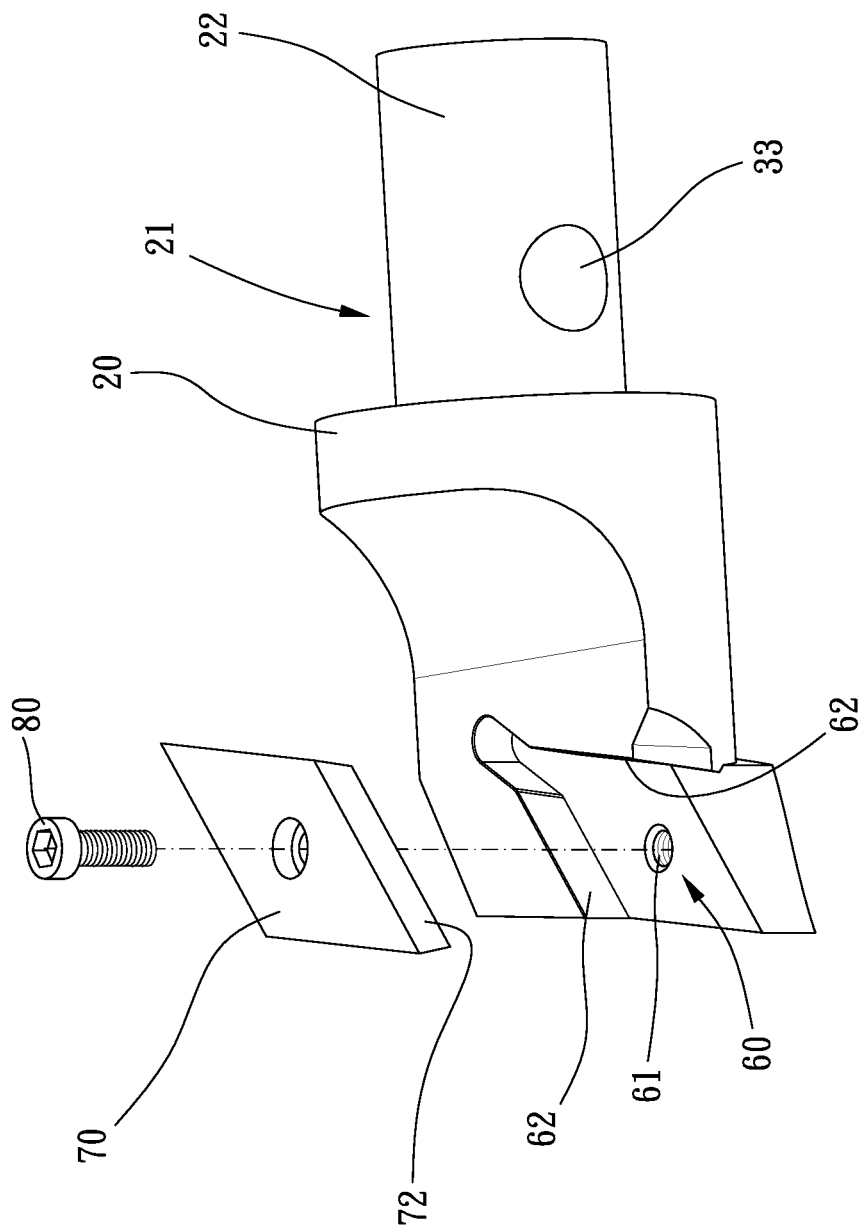
FIG. 5 is a breakdown drawing of a preferred embodiment of an arbor seat of the present invention.
Figure 6:
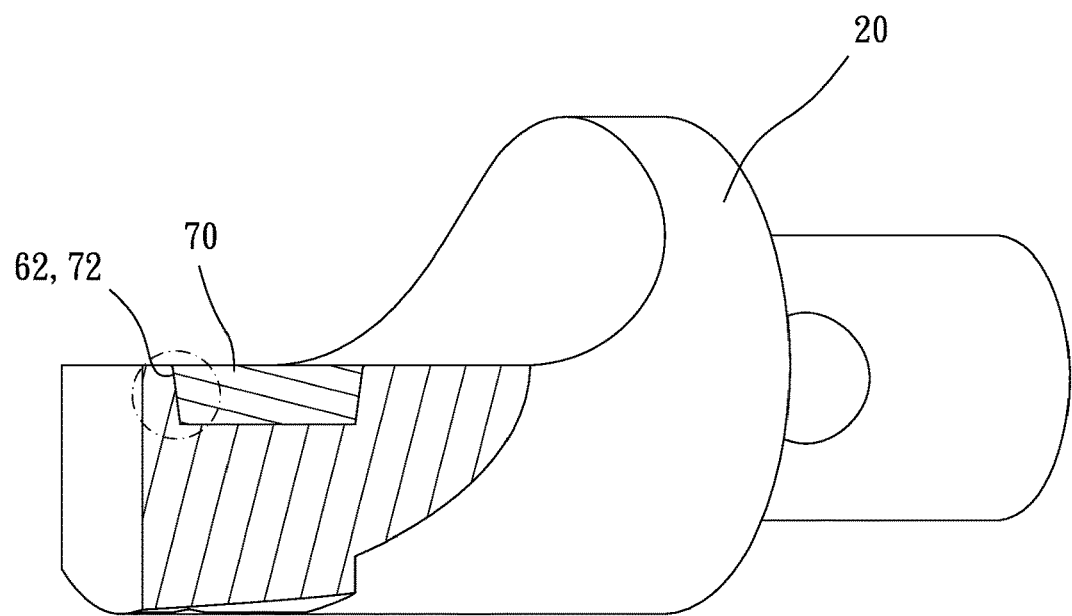
FIG. 6 is a partial cross-sectional view of the arbor seat in an assembled state of the present invention.
Figure 7:
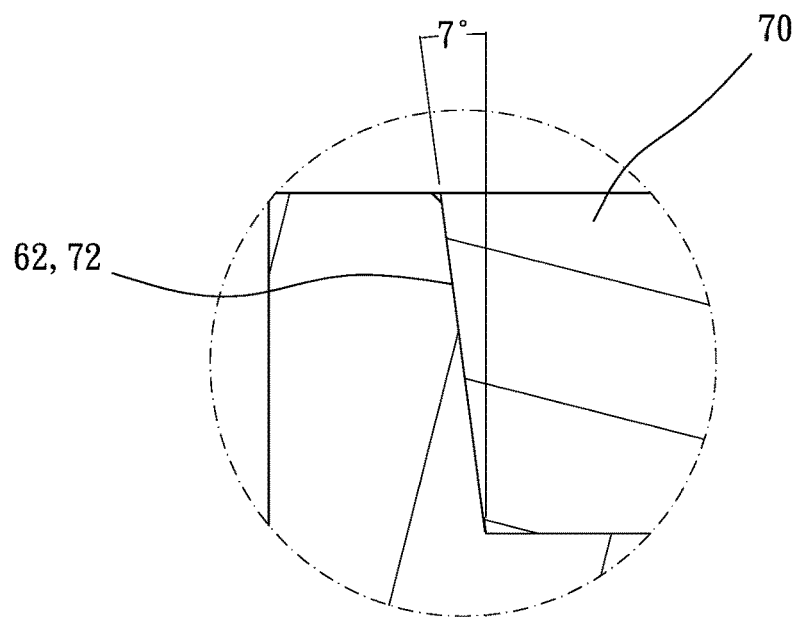
FIG. 7 is a partially-enlarged view of FIG. 6.

As shown in FIGS. 5 to 7, one end of the arbor seat 20 has a receiving 60, a bottom of the receiving 60 has a screw hole 61, a circumferential wall of the receiving 60 is an inclined wall 62 tapered from a top to a bottom of the receiving 60. A range of a slope degree of the inclined wall 62 is between 7° to 11°. Preferably, the slope degree of the inclined wall 62 is 7° or 11°, the Figs of this embodiment only show the slope degree is 7°. The receiving 60 receives a cutting tool 70 and the cutting tool 70 fixes in the receiving 60 through a connecting member 80 and the screw hole 61 which are screwed to each other, so as to securely fix the cutting tool 70 in the receiving 60. Preferably, a circumferential of the cutting tool 70 forms an inclined pyramidal face 72 which is corresponding to the slope degree of the inclined wall 62. When the cutting tool 70 is assembled into the receiving 60, the inclined pyramidal face 72 and the inclined wall 62 can contact with each other tightly and closely to eliminate a finish allowance of the combination of parts through adjusting the connecting member 80 to press the cutting tool 70, as shown in FIG. 7. Therefore, the cutting tool 70 does not shake and shift in milling process, so as to improve the milling accuracy of workpieces.

Given the above, the first assembling portion has the first hole disposed laterally and the second assembling portion has the second hole disposed laterally, each second central axis of the at least one second hole is noncoaxial and nonoverlapped with the at least one first central axis. And the tapered conical end of the fastener disposed through the second hole of the arbor seat to urge insertion head can further disposed the flexible portion, or assembled inserting legs on the end faces of assembling portions which are corresponding to shape, so as to easy assemble and reduce the damping.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A combined arbor structure, including:
an arbor, having a first assembling portion disposed in an axial direction, the first assembling portion having at least one first hole disposed laterally, each of the at least one first hole having a first central axis;
an arbor seat, having a second assembling portion which is disposed in the axial direction, one of the first assembling portion and the second assembling portion being insertably connected with the other of the first assembling portion and the second assembling portion, the second assembling portion having at least one second hole disposed laterally, each of the at least one second hole having a second central axis, when the first and second assembling portions are connected with each other in the axial direction, each second central axis of the at least one second hole is noncoaxial and nonoverlapped with the at least one first central axis; and
at least one fastener;
wherein at least one said fastener is inserted into at least one said first hole and at least one said second hole and urges the at least one said first hole and the at least one said second hole in axially opposite directions relative to the axial direction;
wherein each second central axis of the at least one second hole is parallel to the at least one first central axis of the at least one first hole;
wherein the at least one fastener includes a tapered conical end, the at least one second hole includes an expanded conical opening which faces to the tapered conical end, and the tapered conical end abuts against the expanded conical opening; and
wherein a slope degree of an inclined face of the tapered conical end of the fastener is different from a slope degree of an inclined face of the expanded conical opening of the second hole, and the inclined face of the tapered conical end of the fastener abuts against the inclined face of the expanded conical opening of the second hole.

2. The combined arbor structure of claim 1, wherein one of the first and second assembling portions includes an insertion slot and the other includes an insertion head.

3. The combined arbor structure of claim 2, wherein an end face of the first assembling portion has the insertion slot, and an end face of the second assembling portion has the insertion head.

4. The combined arbor structure of claim 3, wherein the end faces of the first assembling portion and the second assembling portion are abutted against each other.

5. The combined arbor structure of claim 2, wherein a flexible portion is engagingly disposed between a circumferential face of the insertion head and a wall of the insertion slot.

6. The combined arbor structure of claim 5, wherein the flexible portion is disposed on the circumferential face of the insertion head.

7. The combined arbor structure of claim 6, wherein the circumferential face of the insertion head has at least one annular groove, and the flexible portion includes at least one flexible ring received in the at least one annular groove and radially protrudes out of the at least one annular groove.

8. The combined arbor structure of claim 7, further including a positioning pin; wherein an end face of the first assembling portion has the insertion slot, and an end face of the second assembling portion has the insertion head; a bottom of the insertion slot has an expanded slot disposed radially; the insertion head has an annular concave connected with the end face of the second assembling portion; at least a part of the insertion head is disposed within the expanded slot; the end faces of the first assembling portion and the second assembling portion are abutted against each other; each of the end face of the first assembling portion and the end face of the second assembling portion has an insertion hole extending axially, and the positioning pin is inserted into the insertion holes; the slope degree of the inclined face of the tapered conical end of the fastener is 30°; and the slope degree of the inclined face of the expanded conical opening of the second hole is 40°.

9. The combined arbor structure of claim 8, further including a connecting member and a cutting tool, one end of the arbor seat having a receiving pocket, a bottom of the receiving pocket having a screw hole, a circumferential wall of the receiving pocket being an inclined wall tapered from a top to a bottom of the receiving pocket, a range of a slope degree of the inclined wall being between 7° to 11°, the receiving pocket receives a cutting tool, and a circumferential wall of an insert of the cutting tool forming an inclined pyramidal face which is corresponding to the slope degree of the inclined wall, the cutting tool fixed in the receiving pocket through the fastener and the screw hole which are screwed to each other.

10. The combined arbor structure of claim 1, wherein the slope degree of the inclined face of the tapered conical end of the fastener is less than the slope degree of the inclined face of the expanded conical opening of the second hole.

* * * * *